(12) United States Patent
Kempinski

(10) Patent No.: US 9,785,861 B2
(45) Date of Patent: Oct. 10, 2017

(54) METHOD FOR OPTIMIZING SIZE AND POSITION OF A SEARCH WINDOW OF A TRACKING SYSTEM

(75) Inventor: Yitzchak Kempinski, Gava Binyamin (IL)

(73) Assignee: Umoove Services Ltd., Jerusalem (IL)

( * ) Notice: Subject to any disclaimer, the term of this patent is extended or adjusted under 35 U.S.C. 154(b) by 15 days.

(21) Appl. No.: 14/237,882

(22) PCT Filed: Aug. 10, 2012

(86) PCT No.: PCT/IB2012/001556
§ 371 (c)(1),
(2), (4) Date: May 12, 2014

(87) PCT Pub. No.: WO2013/021275
PCT Pub. Date: Feb. 14, 2013

(65) Prior Publication Data
US 2014/0314274 A1  Oct. 23, 2014

Related U.S. Application Data

(60) Provisional application No. 61/521,963, filed on Aug. 10, 2011, provisional application No. 61/524,574, filed on Aug. 17, 2011.

(51) Int. Cl.
*G06K 9/62* (2006.01)
*G06T 7/20* (2017.01)

(52) U.S. Cl.
CPC ............ *G06K 9/62* (2013.01); *G06T 7/20* (2013.01); *G06T 2207/10016* (2013.01); *G06T 2207/30236* (2013.01)

(58) Field of Classification Search
None
See application file for complete search history.

(56) References Cited

U.S. PATENT DOCUMENTS

| 5,341,143 A * | 8/1994 | Reis ..................... F41G 7/2226 244/3.15 |
| 6,538,649 B2 * | 3/2003 | Bradski ................... G06F 3/012 345/419 |

(Continued)

OTHER PUBLICATIONS

Yilmaz et al., Object tracking: A survey. Journal ACM Computing Surveys, Dec. 2006 [retrieved on Dec. 6, 2012] retrieved from the internet: <URL:crcv.ucf.edu/papers/oblect%20Tracking.pdf> p. 1-45.

*Primary Examiner* — Matthew Bella
*Assistant Examiner* — Soo Shin
(74) *Attorney, Agent, or Firm* — Pearl Cohen Zedek Latzer Baratz LLP

(57) ABSTRACT

A method for optimizing the position and size of a search window in a tracking system is disclosed. According to some embodiments of the present invention, the method may comprise: calculating a velocity of a tracked object based on comparison of at least two previously captured consecutive frames; calculating an expected position of the tracked object in a subsequent frame based on calculated velocity of the tracked object; determine possible positions of the tracked object in the subsequent frame, based on the last known position of the tracked object, status of the tracked object, the expected position and the acceleration of the tracked object; and optimizing the size and position of the search window within the subsequent frame so that the search window covers the expected position and at least one of the possible positions of said tracked object.

15 Claims, 4 Drawing Sheets

(56) References Cited

U.S. PATENT DOCUMENTS

| | | | |
|---|---|---|---|
| 2003/0035051 A1 | 2/2003 | Cho et al. | |
| 2003/0095140 A1* | 5/2003 | Keaton | G06F 3/011 715/700 |
| 2005/0031165 A1 | 2/2005 | Olson et al. | |
| 2008/0252725 A1* | 10/2008 | Lanfermann | G06T 7/2013 348/143 |
| 2010/0271484 A1* | 10/2010 | Fishwick | G06T 7/2026 348/169 |
| 2011/0221890 A1 | 9/2011 | Yamashita | |

* cited by examiner

METHOD FOR OPTIMIZING SIZE AND POSITION OF A SEARCH WINDOW OF A TRACKING SYSTEM

CROSS-REFERENCE TO RELATED APPLICATIONS

This application is a National Phase Application of PCT International Application No. PCT/IB2012/001556, International Filing Date Aug. 10, 2012, claiming priority of U.S. Patent Application No. 61/521,963, filed Aug. 10, 2011, and 61/524,574, filed Aug. 10, 2011, all of which which are hereby incorporated by reference.

BACKGROUND OF THE INVENTION

Reducing the dimensions or size of a search window in a computer vision tracking processes may decrease processing time, reduce mismatches and increase predictive results of the tracking. However, reducing dimensions of a search window may increase the chances of losing the tracked object, for example, when the object moves too quickly and as a result exceeds the boundaries of the search window. Defining a proper size or dimension for the search window may therefore balance these factors.

FIG. 1 illustrates a prior art method for determining the size of a search window 100 in a tracking method. Known tracking methods rely on a rule of thumb for sizing search window 100 that sets window 100 dimension around the last tracked position of a tracked object 110 according to the following formula:

Window Size=(2X+tracked Object Width)*(2Y+ tracked Object Height)   Formula 1

Usually search window 100 is created around the last tracked position of tracked object 110 where X & Y are the full range, in the respective directions, that the object may reach in the next scanned frame. This may be calculated based on the last known velocity of the object and the maximum distance, in all possible directions, it may reach over the time between capturing of frames by the tracking system. Thus, for example, if the object is moving in high velocity, the values of X and Y will grow linearly with the velocity and the area of the search window may grow to the power of 2, thus being very large.

SUMMARY OF THE INVENTION

A method for optimizing the position and size of a search window in a tracking system is disclosed. According to some embodiments of the present invention, the method may comprise: calculating a velocity of a tracked object based on comparison of at least two previously captured consecutive frames; calculating an expected position of the tracked object in a subsequent frame based on calculated velocity of the tracked object; determine possible positions of the tracked object in the subsequent frame, based on the last known position of the tracked object, status of the tracked object, the expected position and the acceleration of the tracked object; and optimizing the size and position of the search window within the subsequent frame so that the search window covers the expected position and at least one of the possible positions of said tracked object.

According to other embodiments of the present invention, the acceleration is the maximal acceleration of the tracked object. According to other embodiments of the present invention the acceleration is the maximal relevant acceleration of the tracked object.

According to some embodiments of the present invention, the status of the tracked object determines the range of possible acceleration values used to determine the possible positions of the tracked object in the subsequent frame.

According to yet another embodiment of the present invention, the method may comprise changing the size and position of the search window when the status of the tracked object is changed. According to some embodiments identifying a change in the status is performed by image analysis. According to yet other embodiments change in the status may be initiated by the tracking system.

According to some embodiments of the present invention, calculating the velocity may further comprise detecting a difference between the tracked object position in two or more consecutive frames; and calculating a relative distance traveled by the tracked object within the time interval between capturing of the at least two consecutive frames.

In yet other embodiments of the present invention the calculated velocity is used in order to calculate an expected position of the tracked object only when the calculated velocity is above a predetermined threshold.

According to some embodiments of the present invention, the search window may cover all, substantially all or a portion of the possible positions of the tracked object.

According to some embodiments of the present invention, the size of the search window is dynamically changed according to changes in acceleration of the tracked object.

According to other embodiments of the present invention, the shape of the search window may be dictated by the calculation of possible locations of the tracked object in one or more of the subsequent frames. According to further embodiments, the size and position of the search window may be determined base on one or more factors from a group comprising: the dimensions of the tracked object, a distance between the tracking system and the tracked object, the frame rate of the tracking system, the current possible maximal acceleration, the current relevant maximal acceleration and the current reasonable acceleration of the tracked object.

According to some embodiment of the present invention, the tracked object is a portion of a larger object to be tracked. According to some embodiments the portion of the larger object may be a non-varying unique element in the larger object to be tracked.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
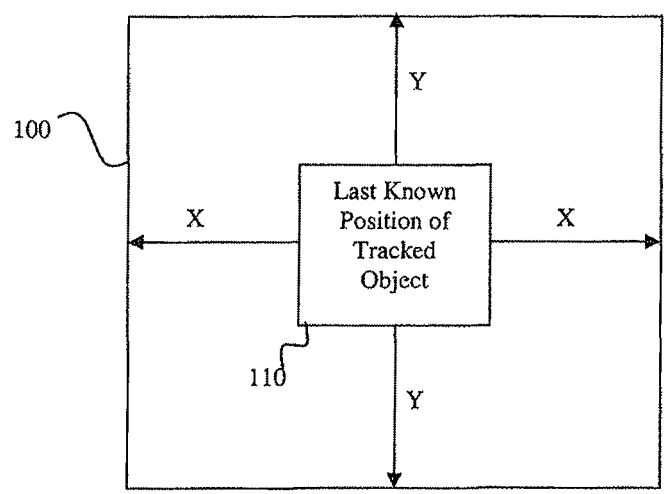
FIG. 1 is an illustration of a prior art method for determining the size of a search window in a tracking method.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 2:
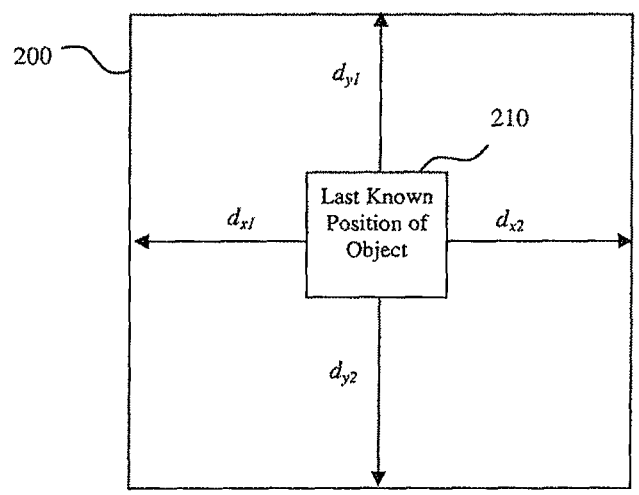
FIG. 2 illustrates an exemplary method for placing a search window in a frame and optimizing the size of a search window in accordance with one embodiment of the present invention.
Figure 3:
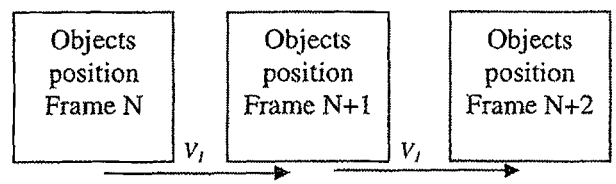
FIG. 3 illustrates a method for placing a search window in a frame according to embodiments of the present invention.
Figure 4:
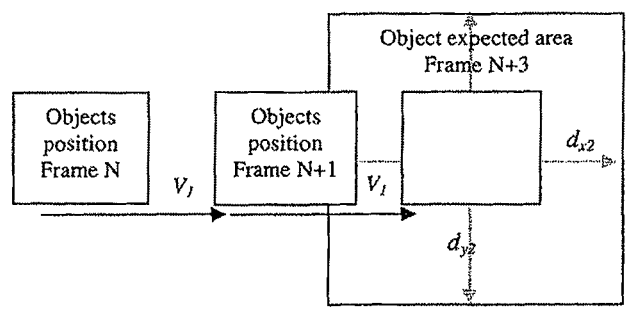
FIG. 4 illustrates an exemplary method for determining the size of a search window in accordance with embodiments of the present invention.

Reference is now made to FIGS. 2, 3 and 4. As may be seen in FIG. 2, in some embodiments, a search window 200 may be sized and located as a function of the last known position 210 of the tracked object.

According to an embodiment of the present invention, the size and position of search window 200 may be determined based on one or more of the following factors: a size of the tracked object 210, the velocity of object 210 between frames that are analyzed and one of the following: the maximum, reasonable or relevant maximal acceleration of object 210 between frames. It would be appreciated by those skilled in the art that the term relevant maximal acceleration refers to the maximal acceleration possible in the conditions and circumstances of tracking session and of the tracked object. For example, when tracking a head rotating when it is positioned at the end of the range that the neck allows, relevant maximal acceleration further in the same direction is close to zero, but in the opposite direction the head may accelerate easily so that the relevant maximal acceleration would be much higher. Another example may be when tracking a user using a computer, the relevant maximal acceleration does not include the possible acceleration of the user doing activities that are not usually done when using a computer (e.g. running, jumping etc.). Thus, in this example the relevant maximal acceleration may be the acceleration of minor head movements, hand movements, pupil movement and the like.

According to some embodiments of the present invention, refining or optimizing a size of a search window may rely on analyzing the speed and one of possible, reasonable or relevant acceleration of an object being tracked so that the window is minimized to only cover one or more next possible positions of the tracked object based on factors such as a last known position, status, velocity and acceleration.

In this application, the term "status" refers to information regarding the tracked object and its properties, that when changed may affect the maximum, reasonable and/or relevant maximal acceleration of the tracked object. For example, when the tracked object is a head of a person, and the person is sitting (that is, the person's status is "sitting") then the maximum acceleration of the person, and thus of his head, is limited to a certain limit in each possible direction, as limited by the physiology of a sitting person. However, when the person stands up (changing his status from sitting to standing), a new range of acceleration values, as well as ranges of movements, should be considered, in each possible direction. In another example, when the status of an object is "standing still", similar or even identical acceleration limitations may be calculated in possible directions, while when the object is moving in a certain direction the maximal relevant acceleration, for instance, in the direction of movement may be different (usually smaller) than the maximal relevant acceleration in the opposite direction.

It would be appreciated by those skilled in the art that identifying a change of status may be by image analysis (such as determining whether a person is sitting or standing based, for example, on the distance of the person's head from the floor). According to other embodiments of the present invention, a change in status may be initiated by an application using the tracking system. For example, when the tracking system is used by a computer game having different stages. In a first stage a first status of a player may be required (e.g. standing) while in another stage the player is required to jump.

As illustrated in FIGS. 3 and 4, according to some embodiments the velocity v 1 and/or acceleration of a tracked object may be detected by analyzing one or more frames ($F_n$, $F_{n+1}$, $F_{n+2}$), for example by comparing the relative location of tracked object 210 in two or more consecutive frames (e.g. $F_n$ and $F_{n+1}$), determining the distance traveled by object 210 between capturing of two or more consecutive frames ($F_n$ and $F_{n+1}$) in in-frame dimensions (i.e. measured in terms of portions of the frame the tracked object moved within the frame), and calculate velocity of object 210 based on the calculated distance and the time interval between the capturing of the two or more consecutive frames. It would be appreciated by those skilled in the art that other methods may be used in order to determine velocity v1 of object 210. According to some embodiments of the present invention, an average velocity is calculated based on comparison of a plurality of consecutive frames captured by tracking system.

As may be seen in FIG. 4, search window 200 in such one or more frames or in subsequent frames may be moved in the direction of the velocity v1 of the object.

According to some embodiments of the present invention, the dimensions of window 200 are calculated to cover all, most of or part of the possible positions object 210 may appear in based on the maximum, reasonable or relevant maximal acceleration.

If there is a change in status of the tracked object 210 which may affect the acceleration and/or maximum acceleration and/or if there is a change in the perceived acceleration and/or maximum acceleration, for example if the distance between the tracked object 210 and a camera (not shown) of the tracking device was changed search window 200 may be both moved and resized to continue and account for all or close to all or a range of reasonably possible positions of the tracked object based on the velocity and acceleration and/or acceleration as perceived by the tracking device.

It would be appreciated that the shape of search window 200 need not be limited to a square, rectangle or other classic geometric shapes. A calculation and analysis of possible locations of object 210 in one or more subsequent frames ($F_n$, $F_{n+1}$, $F_{n+2}$) may dictate a shape of window 200 in such frames that is other than a rectangular centered at the predicted location. Since the predicted velocity and/or acceleration in the X and Y direction of the frames may be non-linear and may be subject to non-homogeneous constrains, the resulting search window may have a shape other than a rectangular. For example, a head being tracked which is connected to a neck is limited to a certain range of movements and the search window may be shaped to not include positions which are not possible or not reasonable or not relevant to the tracking device.

According to some embodiments, a dimension of a search window may be defined dynamically so that such dimensions are altered automatically depending on factors such as, for example, an acceleration and/or max acceleration of an object being tracked within a window.

The dimensions and location of the window may account for, or be based on factors such as i) the size (e.g. height and width) of tracked object 210 (in in-frame dimensions), ii) a distance between the tracking device (not shown) and object 210, iii) the frame rate of the tracking system and iv) the current possible maximal acceleration, relevant maximal acceleration or reasonable acceleration of tracked object 210. Other factors may also dictate a dynamic sizing and positioning of search window 200.

For example, if object 210 is not in motion and if d is the estimated maximum, reasonable or relevant maximum distance that the object may move along a specific axis (based on its maximum, reasonable or relevant maximal acceleration in that axis) between two analyzed frames or captured images, then search window 200 may be set on that axis as the width or height of the tracked object+d in one or both possible directions along the axis that the object is expected to move between frames.

If object 210 is free to move in any direction, then window 200 area or dimension may be calculated for example in accordance to Formula 2:

$$WS=(OW+dx_1+dx_2)*(OH+dy_1+dy_2) \qquad \text{Formula 2}$$

Where: WS is the window size, OW is the object's width and OH is the object's height, dx1, dx2, dy1 and dy2 are the maximum expected deviation of the tracked object from its expected location in the window in each of the respective directions.

Returning now to FIG. 2, the window in a frame (where for example top left corner of a screen of the tracking system (not shown) is (0,0)) may be placed so its top left corner is at the following coordinates: (last known position of Object in the x axis—dx1, last known position of Object in the y axis—dy1) and the last known position of object 210 is in the middle of search window 200 if dx1=dx2 and dy1=dy2. It would be appreciated, however, that the search window may be placed so that the tracked object expected position is not necessarily placed in the middle of the window. For example, when the possible directions of movement of the tracked object are limited, impossible directions of movement may not be covered by search window 200 and tracked object 210 may be located along or close to an edge of search window 200.

According to some embodiments of the present invention, when the system detects a difference between the object's positioning in two or more consecutive frames, that difference is calculated to retrieve the velocity of the object (in some embodiments, this distance may be calculated as a velocity only when it is beyond a threshold value, to eliminate the effect of undesired noise, such as instability of a camera).

In the next frame scanned, the search window may be repositioned based on the last known velocity of the object, so that if there was no change in the velocity, the object should be found in the predicted location, such as, for example, in the middle of search window 200 (when there is no limitation to the acceleration in any directions), as shown in FIG. 3. If there was an acceleration in between frames, in any relevant direction, the new position is expected to be covered by search window 200 area, since, as described above, search window 200 covers distances dy1, dy2 and dx1, dx2 in the directions and in the amount which are possible, reasonable or relevant directions and amounts the object may move on each axis with its maximum, reasonable or relevant acceleration while not taking into consideration its velocity, as illustrated in FIG. 4.

In some embodiments, upon an increase or decrease of the max, reasonable or relevant acceleration of the tracked object (for example a walking human being tracked gets on a motorcycle) or a change in the perceived affect of the acceleration (for example changes in the distance between the object and the camera of the tracking device, or changes in the time between captured or scanned frames), the search window may be resized to cover the new possible, reasonable or relevant distances (dx1, dx2, dy1, dy2) object 210 may travel in between frames ($F_n$, $F_{n+1}$, $F_{n+2}$). This as above, not taking into account the current velocity, which is dealt with by the repositioning of the window and not its resizing.

Figure 5:
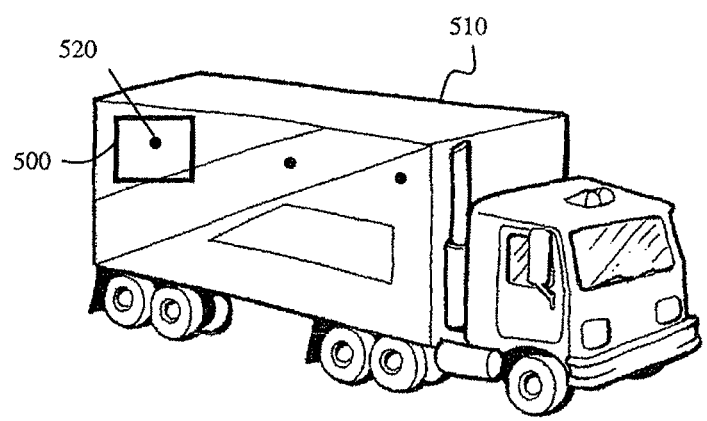
FIG. 5 illustrates an additional method for optimizing the size of a search window in accordance with embodiments of the present invention.

Reference is now made to FIG. 5, which illustrates a method for reducing the size of a search window 500 of a tracking system.

According to one embodiment of the present invention, replacing the representation of a tracked object with a substitute object which is smaller than the original tracked object, may allow a further reduction in the dimensions of search window 500. This may be achieved by tracking a substitute object that substitutes the original tracked object, which may be a small, unique part, such as black circle 520, of a larger object, such as truck 510. Proper selection of the substitute object may ensure that tracking it practically equals tracking the original object which makes it an effective focus of the tracking system, rather than tracking the whole object 510.

Replacing the entire object 510 being tracked, or reducing or refining object 510 being tracked to one or a few components of, or group of pixels of the nominal object, may allow the dimensions of search window 500 to be smaller.

As illustrated in FIG. 5, if truck 510 travelling on a highway is being tracked, search window 500 may be defined to include only a graphic element, such as a dot or a circle 520 on the side of the truck 510, rather than the entire truck 510.

Similarly, if a face is being tracked, a search window may be defined to include only the eyes or an eye brow, freckle or dot rather than the entire face. In some embodiments, a single, substantially stable, or non-varying, unique element, such as for example a pupil or iris of an eye, in a larger image may be defined as the tracked element, and the search window may be defined around that element. In such case, even if a large object is being tracked, the search window may be kept limited to the small but stable substitute object within the larger object in the image. In this description the term "stable" is to be understood as a portion of the image of the tracked object the movement of which is known to equal to the movement of the tracked object and that is expected to remain in the LOS (line of sight) of the tracking device during the tracking.

The substitute object 520 may preferably be unique within the possible elements that may appear in search window 500 and therefore may be, for example, just a small black dot within a solid color background within a larger object 510 being tracked.

It would be appreciated by those skilled in the art that after reducing the size of search window 500 as described above with respect to FIG. 5, further optimization of the size and location of search window 500 may be conducted in accordance with the method described above with reference to FIGS. 2-4.

Figure 6:
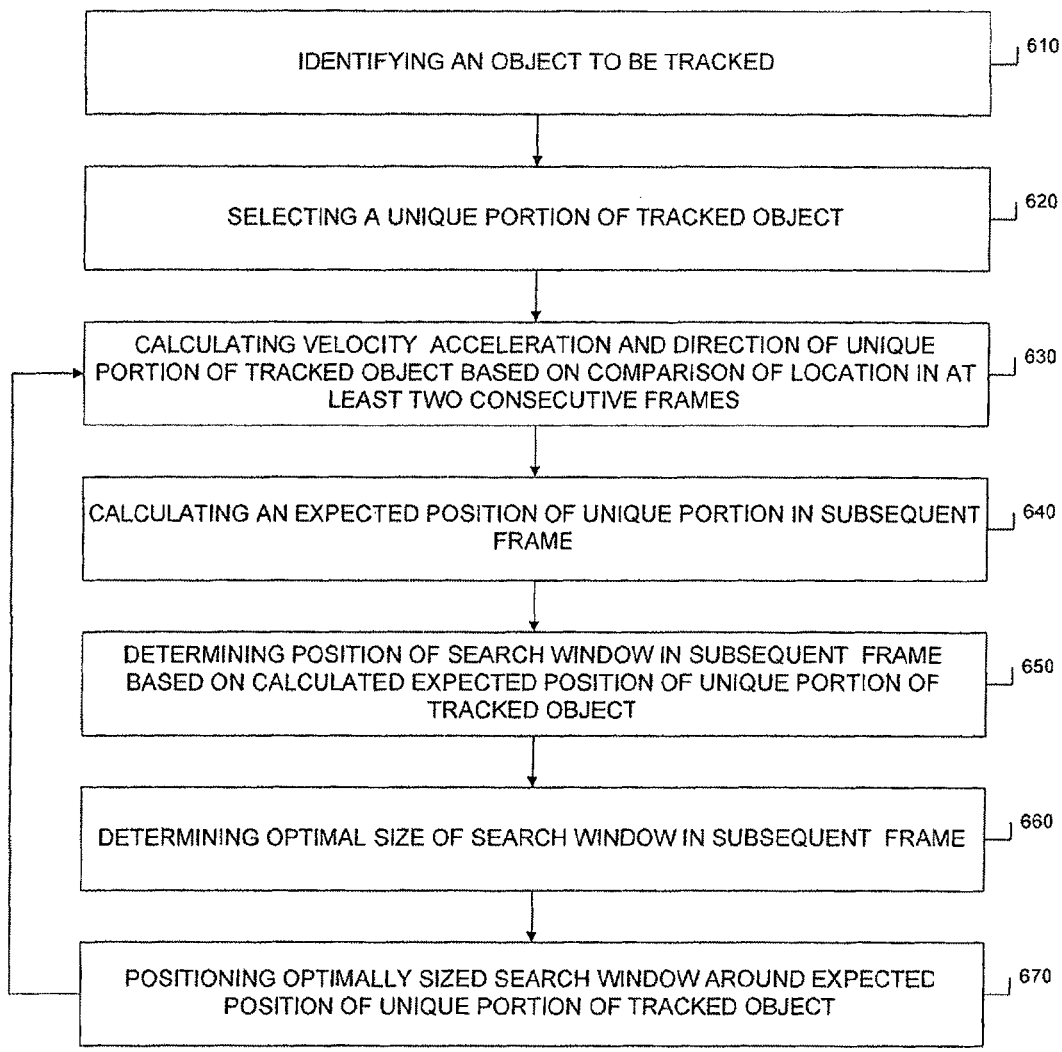
FIG. 6 is a flowchart of an exemplary method for placing a search window in a frame and optimizing the size of a search window in accordance with embodiments of the present invention.

Reference is now made to FIG. 6 which is a flowchart of a method for optimizing the size and location of a search window of a tracking system according to an embodiment of the present invention. As seen in FIG. 6 the method may comprise the following steps:

Identifying an object to be tracked [block 610].

Selecting a portion of tracked object having smaller dimensions than the entire tracked object [block 620]. As described with respect to FIG. 5 above, the selected portion of the tracked object may be, a unique graphical element, for example, a small black dot within a solid color background within a larger object being tracked. In some embodiments, a single, stable, or non-varying, unique element, such as for example a pupil or iris of an eye, in a larger image may be defined as a unique portion of a tracked object. It would be further appreciated that the unique portion of the tracked object may be one or a few components of, or group of pixels of the entire traced object.

Calculating velocity, acceleration and direction of unique portion of tracked object based on comparison of location in at least two consecutive frames [block 630]. According to some embodiments of the present invention, calculating the velocity of a tracked object or of a unique portion thereof may comprise detecting a difference between the object's positioning in two or more consecutive frames, calculating a relative distance traveled by tracked object within the time interval between capturing of the at least two consecutive frames and retrieving the velocity of the object (in some embodiments, this distance may be calculated as a velocity only when it is beyond a threshold value, to eliminate the effect of undesired noise, such as instability of a camera). It would be appreciated that the acceleration of tracked object may be calculated by comparing two consecutive calculated velocities.

Calculating an expected position of unique portion of tracked object in a subsequent frame [block 640]. The calculation of the expected position of an object (or a portion thereof) may be based on the velocity calculated in block 630 above.

Determining position of search window in next frame based on calculated expected position of unique portion of tracked object [block 650]. In the next frame scanned, the search window is repositioned based on the last known velocity of the object, so that if there was no change in the velocity, the object should be found in predicted locations of the tracked object in the search window. It would be appreciated that the object predicted location is not necessarily in the middle on the search window.

Determining optimal size of search window in next frame based on maximal/expected/relevant distance reachable by unique portion of tracked object according to acceleration [block 660]. If there was an acceleration in between frames, in any relevant direction, the new position of the tracked object is expected to be covered by search window area, since as described above the search window covers distances dy1, dy2 and dx1, dx2 in the directions and in the amount which are possible, reasonable or relevant directions and amounts the object may move on each axis with its maximum, reasonable or relevant acceleration while not taking into consideration its velocity.

In some embodiments, upon an increase or decrease of the max, reasonable or relevant acceleration of the tracked object (for example a walking human being tracked gets on a motorcycle) or a change in the perceived affect of the acceleration (for example changes in the distance between the object and the camera of the tracking device, or changes in the time between captured or scanned frames), the search window may be resized to cover the new possible, reasonable or relevant distances (dx1, dx2, dy1, dy2) object 210 may travel in between frames ($F_n$, $F_{n+1}$, $F_{n+2}$). This as above, not taking in to account the current velocity which is dealt with by the repositioning of the window [block 650 above] and not its resizing.

Positioning optimally sized search window around expected position of unique portion of tracked object [block 670]. It would be appreciated that while the unique portion of tracked object is expected to be within the search window, the tracked object may exceed the border lines of the search window in one or more directions.

According to some embodiments of the present method, steps 630-670 may be repeated as long as the object or a portion thereof is being tracked.

It would be appreciated that according to some embodiments of the present invention, not all steps of the method may be required. For example, in some embodiments, the step of selection a portion of the tracked object may not be required.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for optimizing a position and size of a search window in a tracking system, the method comprising:
    calculating velocity of a tracked object based on comparison of at least two captured consecutive frames;
    calculating an expected position of said tracked object in a third frame consecutive to the at least two captured consecutive frames, and based on at least the calculated velocity of said tracked object;
    determining a status of said tracked object;
    determining possible acceleration based on said status of said tracked object;
    determining possible positions of said tracked object in said third frame, based on a last known position of said tracked object, said status of said tracked object, said expected position and the possible acceleration of said tracked object; and
    determining size and position of said search window within said third frame so that said search window covers said expected position and at least one of said possible positions of said tracked object,
    wherein the size and position of said search window are dynamically changed according to changes in the status and according to changes in expected positions of said tracked object, wherein the status comprises information regarding a condition of the object affecting a range of maximal acceleration associated with the condition, and wherein the condition is at least one from the group consisting of an activity of the tracked object, body part movements, movement in a certain direction, standing still and surroundings of the tracked object.

2. The method according to claim 1 wherein said acceleration is the maximal acceleration of said tracked object.

3. The method according to claim 1 wherein said acceleration is the maximal possible acceleration of said tracked object in the determined status of said tracked object.

4. The method according to claim 1 wherein said status of said tracked object determines the range of possible acceleration values used to determine said possible positions of said tracked object in said third frame.

5. The method according to claim 1 wherein identifying a change in said status is performed by image analysis.

6. The method according to claim 1 wherein a change in said status is initiated by said tracking system.

7. The method according to claim 1 wherein said calculating of said velocity further comprises:
detecting a difference between said tracked object position in two or more consecutive frames; and
calculating a relative distance traveled by said tracked object within the time interval between capturing of said at least two consecutive frames.

8. The method according to claim 7 wherein said calculated velocity is used in order to calculate an expected position of said tracked object only when said calculated velocity is above a predetermined threshold.

9. The method according to claim 1 wherein said search window covers all of said possible positions of said tracked object.

10. The method according to claim 1 wherein the shape of said search window is dictated by said calculation of possible positions of said tracked object in at least said third frame.

11. The method according to claim 1 wherein said size and position of said search window are determined based on one or more factors from a group comprising: the dimensions of said tracked object, a distance between said tracking system and said tracked object, the frame rate of said tracking system, and the current possible maximal acceleration.

12. The method according to claim 1 wherein said tracked object is a portion of a larger object to be tracked.

13. The method according to claim 12 wherein said portion is a non-varying unique element in said larger object to be tracked.

14. The method according to claim 1 wherein said activity of the tracked object comprises sitting, standing, walking, running, jumping and using a computer.

15. The method according to claim 1 wherein said body part movements comprise head movements, hand movements and eye movements.

* * * * *